Figure 1:
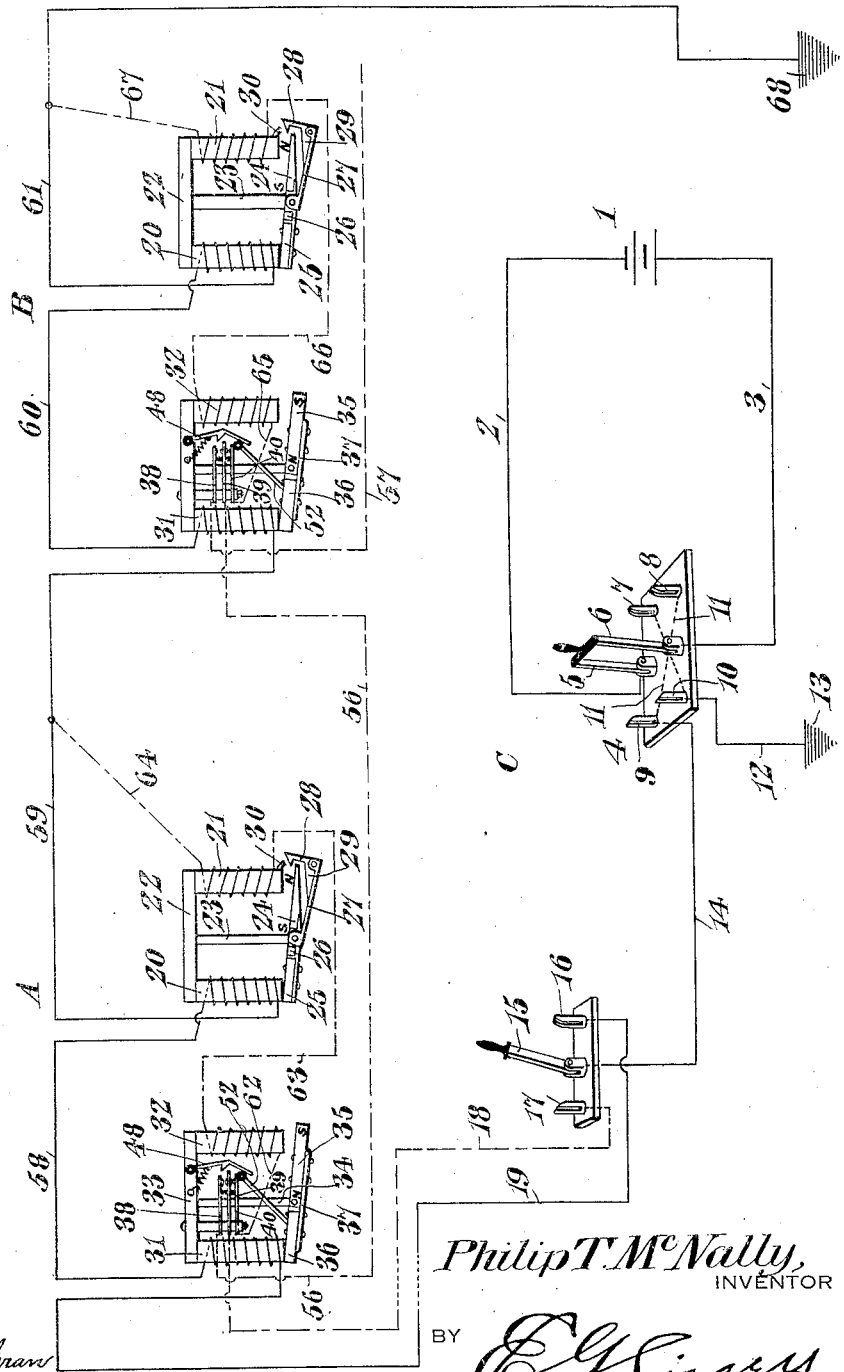

P. T. McNALLY.
SYSTEM OF SELECTIVE CONTROL OF REMOTE CONTROL SWITCHES.
APPLICATION FILED JUNE 10, 1913.

1,112,019.

Patented Sept. 29, 1914.

2 SHEETS—SHEET 1.

Philip T. McNally,
INVENTOR

P. T. McNALLY.
SYSTEM OF SELECTIVE CONTROL OF REMOTE CONTROL SWITCHES.
APPLICATION FILED JUNE 10, 1913.
1,112,019.
Patented Sept. 29, 1914.
2 SHEETS—SHEET 2.
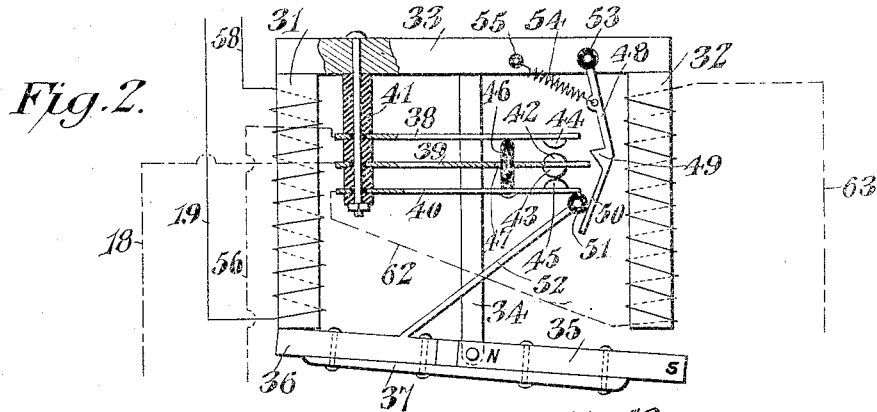
Fig. 2.
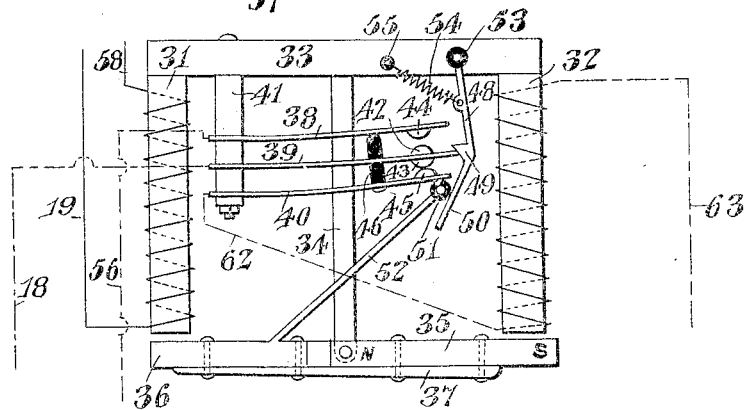
Fig. 3.
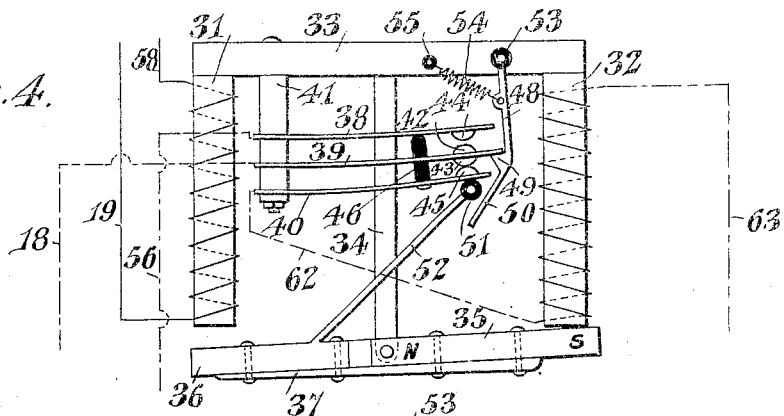
Fig. 4.
Fig. 5.
Philip T. McNally, INVENTOR
WITNESSES
ATTORNEY

UNITED STATES PATENT OFFICE.

PHILIP THOMAS McNALLY, OF DUNLAP, IOWA.

SYSTEM OF SELECTIVE CONTROL OF REMOTE-CONTROL SWITCHES.

1,112,019.  Specification of Letters Patent.  Patented Sept. 29, 1914.

Application filed June 10, 1913. Serial No. 772,906.

*To all whom it may concern:*

Be it known that I, PHILIP T. McNALLY, a citizen of the United States, residing near Dunlap, in the county of Harrison and State of Iowa, have invented a new and useful System of Selective Control of Remote-Control Switches, of which the following is a specification.

This invention has reference to improvements in a system of selective control of remote control switches, and its object is to provide a means whereby any desired number of remote control switches may be selectively controlled from some distant point, such as a power-house, with the employment of a minimum number of line wires.

In accordance with the present invention each remote control switch has associated with it a polarized relay and a switch structure associated with the relay to provide for the automatic coupling up of the control line to more distant control devices, so that an operator at the power-house, which may be taken as indicative of any point from which distant control is desired, may, at will, cause the operation of the chosen one of the distant control devices.

The system has a wide range of use and will be found especially advantageous in connection with sign work and sub-station control for the remote control switches may be made to work on any voltage and amperage.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modification mark no material departure from the salient features of the invention.

In the drawings:—Figure 1 is a diagram illustrating the present invention. Figs. 2, 3, 4 and 5 are diagrams showing different phases of operation of a polarized relay and contact members controlled thereby, as employed in the present invention.

Referring to the drawings, there is shown in Fig. 1 two stations A and B which may be taken as indicative of any suitable number of remote control stations, while the near control station is represented at C. At the station C, which may be a power house or other suitable point from which the stations A and B are to be controlled, there is provided a source 1 of direct current, such source being indicated as an ordinary battery, but any suitable source capable of supplying a current such as is needed for the operation of the system, may be provided. The current source 1 is connected by conductors 2 and 3 to a circuit controlling device 4 shown as an ordinary double-pole double-throw switch having double switch arms 5, 6, respectively. and contacts 7, 8, 9 and 10, having cross connections 11 between them. The contact 10 is indicated as connected by a conductor 12 to ground in turn indicated at 13, while the contact 9 is connected by a conductor 14 to a switch arm 15 of a double-throw single-pole switch having contacts 16, 17, respectively, which in turn are connected to respective conductors 18 and 19, the conductor 18 being indicated by a dot and dash line and the conductor 19 by a solid line simply for the purpose of distinction and having no other significance.

The distant control stations A and B are alike and there may be more than two such stations. A description of one station will apply to both. At each station there is a control magnet having two electro-magnets 20 and 21 which for convenience of mounting may have a common support 22 which should be of a non-magnetic material and may, therefore, be made of brass, although such particular material is not obligatory. Suitably mounted, as by a post 23 which may be secured to the support 22 or to any other support, is a lever made up of a permanent magnet 24 and a soft iron member 25 connected together by a strap 26 of brass or other suitable non-magnetic material. The part 24 being magnetized, is thereby polarized and by preference the end of this magnet constituting part of the armature of what constitutes the control magnet, has its north pole presented toward the magnet 21 and its south pole presented toward the pivot support 23 of the armature. Connected to the pivotal support of the armature is a trigger plate 27 of non-magnetic material, such as brass, and a latch or trigger 28 having a tail piece 29 in the path of the corresponding end of the armature lever, while the magnet 21 carries a catch member 30 with which the trigger may engage. This control magnet may be substantially identical with the control magnet shown in Letters Patent No. 954,327 for an electric cut-out granted to me on April 5, 1910, and may be taken as indicative of the structure set forth in the said Letters Patent without the necessity of showing such structure in the present application, for the invention of this application has to do with the operation of the control magnets to cause from a distant point the operation of the cut-out mechanisms.

The structure of the control magnet does not in itself form any part of the present invention, and has only been described to facilitate an understanding of the operation of the present invention.

Associated with each control magnet is a polarized relay made up of electromagnets 31, 32, which, like the control magnet, may have a common support 33 of non-magnetic material, preferably, though not necessarily, brass. Extending from the support 33 is a post 34 carrying an armature made up of a permanently magnetic section 35 and a soft iron part 36 which may be in line one with the other and connected together by a strap 37 preferably, though not necessarily, of brass. The magnet 35 and soft iron continuation 36 constitute an armature for the two magnets 31 and 32. For reasons which will hereinafter appear, it is desirable that the permanent magnet 35 polarizing the armature of the magnets 31 and 32 have its south pole adjacent the magnet 32 and its north pole distant therefrom, this being just the reverse of the polarized section 24 of the armature of the control magnet. The polarized relay is shown more in detail in Figs. 2 to 5. Combined with the polarized relay are three spring fingers 38, 39, 40 all mounted on a support 41 which may be of insulating material and may be carried by the brass support 33, or these fingers may be otherwise sustained. The support 41 may be wholly or partially of insulating material, but whatever be the structure, the fingers 38, 39 and 40 should be insulated one from the other at the support. The finger 39 has contacts 42, 43, respectively, on opposite sides, while the finger 38 has a contact 44 presented toward the contact 42 and the finger 40 has a contact 45 presented toward the contact 43 and normally in engagement therewith. The finger 40 carries a pin 46 of insulating material extending through a passage 47 in the finger 39 and of a length to ordinarily engage the finger 38, thus moving the fingers 38 and 46 apart a definite distance determined by the length of the pin 46, so that these fingers may never approach closer than permitted by the said pin.

Carried by the support 33 is a catch arm 48 having a tooth 49 arranged to be engaged by the free end of the finger 39 which may be somewhat longer than the other fingers, and the arm 48 has a continuation 50 which under certain positions of the parts is in the path of a roller 51 on one end of an arm 52 carried by and projecting from the armature of the magnets 31 and 32. The roller 51 may be of insulating material and the arm 48 if of metal may be insulated from the support 33, as indicated at 53. The arm 48 is biased in one direction by a spring 54 connected at 55 to the support 33 and insulated therefrom, all the representations of insulation being more or less indicative of any manner of avoiding short circuits.

The conductor 18 is connected to the finger 39 of the relay of the first station A, while the finger 38 of the same relay is connected by a conductor 56 to the finger 39 of the polarized relay of station B, and the finger 38 at station B is connected by a conductor 57 to the finger 39 of the next station in order, and this arrangement is continued throughout the entire system.

The conductor 19 is connected to one end of the winding of the magnet 31 of station A, while the other end of this magnet is connected by a conductor 58 to the opposite end of the winding of the magnet 20 of the control magnet at the same station. The other end of the winding of the magnet 20 of the control magnet of station A is connected by a conductor 59 to one end of the winding of the magnet 31 of the polarized relay of station B, this being the same end of the magnet 31 as that to which the conductor 19 is connected at station A. The other end of the magnet 31 at station B is connected by a conductor 60 to the relatively opposite end of the winding of the magnet 20 of the control magnet of station B; while the other end of this magnet is connected by a conductor 61 to the next polarized relay in order, and so on throughout the system.

The finger 40 at station A is connected to the same end of the winding of the magnet 32 as is the conductor 19 to the winding of the magnet 31, this connection being by way of a conductor 62, while the other end of the winding of the magnet 32 is connected by a conductor 63 to the end of the magnet 21 of the control magnet at station A opposite to the connection of the conductor 58 to the winding of the magnet 20 of the same control magnet. The other end of the winding of magnet 21 is connected by a conductor 64 to the conductor 59. The finger 40 at station B is connected by a conductor 65 to one end of the winding of the magnet 32 at station B in the same manner as the finger 40 at station A and the winding of the magnet 32 is connected by a conductor 66 to the winding of the magnet 21 at the same station in the same manner as at station A and the other end of the winding of the magnet 21 is connected by a conductor 67 to the conductor 61. This same order of connections is continued throughout the system and at the farther end of the system there is a ground connection 68.

Let it be assumed that it is desired to operate the instrument at station A only. The switch arm 15 is moved until in engagement with the contact 17, thus bringing the line conductor 18 in circuit with the contacts 8 and 9 of the switch 4. The switch arms 5 and 6 are now moved in a proper direction to cause a south pole polarity to be developed in the magnet 21 at the end facing the north pole of the permanent magnet 24 at station A. At the same time there will be a south pole developed in the magnet 32 at the end adjacent the south pole of the permanent magnet 35. This will cause only the electro-magnet 21 at station A to attract its armature, it being understood that the fingers 39 and 40 have their contacts 43 and 45 in engagement, so that there is a circuit established from the battery 1 to the conductor 14, and thence by way of the switch arm 15 and contact 17 to the conductor 18, through the finger 39 to the finger 40, thence by way of the conductor 62 through the magnet 32, by way of the conductor 63 through the magnet 21 to the conductor 64, thence by way of the magnet 31 at station B to conductor 60, thence by way of magnet 20 at station B to conductor 61 and finally to the ground 68, returning by the ground 13 to the conductor 12 and back to the battery 1 through the switch 4. Although the magnets 31 and 20 at station B become active they simply hold their armatures in the inactive position and so nothing occurs at station B, since the magnets 31 and 20 have no polarized armatures and consequently only attract their soft iron armatures strongly. The result of all this is that the control magnet at station A becomes active to cause the operation of the cut-out under the influence of the control magnet at station A, while the other control magnets along the line are not affected. To restore the line to its first condition it is only necessary to throw the switch arm 15 into engagement with the contact 16 which thereupon brings the conductor 19 into circuit sending current through the magnet 31, which having an unpolarized armature 36 only causes the latter to be more vigorously attracted, while the circuit continues through the conductor 58 by way of the magnet 20 and to the conductor 59 and so on as before. The magnets 32 and 21 are now demagnetized since their circuit is broken, so that the magnet 20 becomes active, to the nonpolarized portion 25 of the armature of the control magnet at station A, thus rocking it until it is in engagement with the magnet 20. Suppose, now, that it is desired to operate the cut-out at station B. The switch arm 15 is moved to bring the conductor 18 into circuit, but the switch arm of the controller 4 is thrown in a direction to couple up the battery 1 in such a manner that a north pole will be developed in the magnet 32, whereupon the armature 35 is attracted, since the end of the polarized armature 35 adjacent the magnet 32 is of south polarity, while the magnet 21 is energized in a manner to repel its armature so that the latter is not attracted at all. The energization of the magnet 32 at station A in the manner described, causes the rocking of the armature 35 so that the roller 51 rides along the spring finger 40 forcing it toward the spring fingers 39 and 38. The pin 46 maintains the relation of the fingers 40 and 38, while the contacts 43 and 45 maintain the relation of the fingers 40 and 39. As this movement continues the free extremity of the finger 39 rides along the tooth 49 rocking the arm 48 against the action of the spring 54 and by the time the armature member 35 reaches the corresponding end of the magnet 32 the spring finger 39 has passed beyond the tooth 49 and the spring 54 causes the arm 48 to move until the tooth 49 has snapped behind the extended end of the finger 39, this last position being indicated in Fig. 4. The contact 44 of the spring finger 38 is still maintained out of engagement with the contact 42 because of the pin 48. Now on throwing switch arms 5 and 6 in the reverse direction, the circuit through the magnet 32 is broken and its armature moves away under the action of the spring finger 40 through the arm 52, thus permitting the contact 44 on the finger 38 to engage the contact 42 on the finger 39, the said finger 39 being locked by the tooth 49. When the switch 4 is manipulated to close the circuit in the proper direction through the conductor 18, the current passes by way of the finger 39 to the finger 38, and thence by way of the conductor 56 to the finger 39 at station B, the current now establishing a south pole in the magnet 32 at station B to repel the armature 34 from its magnet and establishing a south pole in the magnet 21 of the control magnet causing the attraction of its armature 24 and the operation of the cut-out at station B. To operate successive stations, station B may be cut out by manipulation of the switch 4 to actuate the relay switch in the manner already described with reference to station A and then the next station in order may be so coupled up that its control magnet can be operated, and so on throughout the system. When it is desired to restore the parts the switches 4 and 15 are so manipulated that the conductor 19 is energized, whereupon all the magnets 31 become active to attract the respective armatures, and each arm 52 is rocked, so that the roller 51 is brought into engagement with the prolongation 50 of the arm 48 and the arm is in turn rocked against the action of the spring 54 until the tooth 49 is out of the path of the finger 39 and the latter snaps back into place pulling away from electrical engagement with the finger 38, thus restoring the original conditions with the fingers 38, 39 and 40 in the positions indicated in Fig. 2.

What is claimed is:—

1. A system for the control of remote control switches, comprising an electro-magnetic control means at each distant station, a polarized relay associated with each of said remote control means, means under the control of each polarized relay for directing current to the next control station in order, and means for causing current to flow in the desired direction through the polarized relay to cause the latter to operate or to remain quiescent, at will.

2. A system for the selective control of remote control switches, comprising polarized control magnets each at a distant station, a polarized relay associated with each control magnet, the polarized relay and the polarized control magnet having active magnets in series and restoring magnets in series, different circuit connections for each group of magnets, means for directing current to either set of magnets, at will, means for controlling the direction of flow of current through the active magnets at will, and means associated with each polarized relay for cutting out the active magnets at the station where the relay is located and coupling up the control line of the next station in order.

3. A system of selective control of remote control switches, comprising a control magnet and a polarized relay associated therewith at each distant station, each control magnet and polarized relay associated therewith comprising two separate electromagnets, an armature common to both electromagnets and polarized with respect to one of those electromagnets on the relay and control magnet active to the respective polarized armatures being connected in series, and the other electromagnets being also connected in series, means under the control of the armature of the polarized relay for cutting the associated control magnet out of circuit, and means for energizing the magnets having the polarized armatures to produce therein different polarities, at will.

4. A system of selective control of remote control switches, comprising a control magnet and a polarized relay associated therewith at each distant station, each control magnet and polarized relay associated therewith comprising two separate electromagnets, an armature common to both electromagnets and polarized with respect to one of them, those electromagnets on the relay and control magnet active to the respective polarized armatures being connected in series and the other electromagnets being also connected in series, means under the control of the armature of the polarized relay for cutting the associated control magnet out of circuit, and means for energizing the magnets having the polarized armatures to produce therein different polarities, at will, the system also including means for directing current through all the electromagnets controlling the nonpolarized portions of the armatures simultaneously throughout the system.

5. A system for the selective control of remote control switches, comprising a series of sets each including a control magnet having separate electromagnets, and an armature common to both and polarized with respect to one of the magnets, and a polarized relay associated with the control magnet and also including separate electromagnets with an armature common to both and polarized with respect to one of the electromagnets, and means associated with each polarized relay for cutting the control magnet out of circuit.

6. A system for the selective control of remote control switches, comprising a main control station and remote control stations, each remote control station including a control magnet having separate electromagnets and an armature common to both and polarized with respect to one of the electromagnets, and a polarized relay having separate electromagnets and an armature common to both and polarized with respect to one of the magnets, conductors extending from the first-named control station, one conductor being normally connected to the electromagnets of the relay and control magnet acting on the polarized portion of the armature, and each succeeding station having a like connection with the preceding polarized relay provided with means for coupling up the said electromagnets with the line, means at the first-named control station for causing the actuation of the polarized relays to couple up successive stations, as desired, and cut-out the control magnet of the preceding stations, circuit connections from the first-named station to all the electromagnets of all the stations other than those acting on the polarized portions of the armatures, and means for directing current through the last-named circuit connections to energize the last-named magnets.

7. In a system of selective control of remote control switches, a polarized relay comprising separate electromagnets, a pivoted armature common to both and having the portion responsive to one of the magnets polarized, circuit controlling members associated with the polarized relay and normally including the electromagnet acting on the polarized section of the armature in circuit, and means under the control of the armature for cutting the said electromagnet out of circuit and switching the line connections away therefrom.

8. In a system of selective control of remote control switches, a polarized relay provided with separate electromagnets, a pivoted armature common to both and having a polarized section individual to one of the magnets, separate connections for energizing the magnets, and means for shifting the circuit connections to cut out the magnet acting on the polarized section of the armature.

9. In a system of selective control of remote control switches, a polarized relay provided with separate electromagnets, a pivoted armature common to both and having a polarized section individual to one of the magnets, separate connections for energizing the magnets, and means for shifting the circuit connections to cut out the magnet acting on the polarized section of the armature, said circuit shifting means comprising a series of three associated spring fingers with one intermediate of the others and normally in contact with one of said others, the finger normally contacting with the intermediate finger being provided with means for engaging the third finger to hold it in spaced relation thereto, a holding device for engaging the intermediate finger when moved in one direction, and means controlled by the armature for causing movements of the fingers to engage the intermediate finger and a movement of the holding device to disengage the intermediate finger in accordance with the direction of movement of the armature.

10. In a system of selective control of remote control switches, a polarized relay comprising separate electromagnets with separate electric connections, a pivoted armature common to both magnets and having a polarized section individual to one magnet, and means for cutting out the magnet to which the polarized section of the armature is individual, comprising a series of three associated spring fingers with one intermediate of the others and in normal electrical contact with one of said others, means carried by the said outer finger for moving the other outer finger, an arm having a tooth thereon in the path of the intermediate finger and having a normal constraint theretoward, and an arm carried by the armature in position to engage the first-named outer finger to move the other fingers on the rocking of the armature toward the magnet controlling the polarized section of the armature to cause the latching of the intermediate finger behind the tooth on the first-named arm, and said first-named arm having a part in the path of the second-named arm to be moved by the latter out of the path of the intermediate finger on the rocking of the armature in a direction away from the magnet controlling the polarized end of the armature.

11. In a system of selective control of remote control switches, a polarized relay comprising separate electromagnets, a pivoted armature common to both magnets and provided at one end with a polarized section and at the other with a nonpolarized section, means for energizing the magnet controlling the nonpolarized section of the armature, means for energizing the magnet controlling the polarized section of the armature, and means controlled by the armature for cutting the last-named magnet into and out of circuit in accordance with the direction of rocking of the armature.

12. In a system of selective control of remote control switches, a polarized relay comprising separate electromagnets, an armature common to both magnets having one end attracted by one of the magnets irrespective of its polarity and the other end polarized, separate circuit connections for the respective magnets, and circuit controlling means for the second-named magnet controlled by the armature and related thereto to cut the second-named magnet out of circuit when the armature is in one position and to restore it to the circuit when the armature is in another position.

In testimony, that I claim the foregoing as my own, I have hereto affixed my signature in the presence of two witnesses.

PHILIP THOMAS McNALLY.

Witnesses:
 DANIEL MORRISON,
 LAPSLEY W. HOPE.

Copies of this patent may be obtained for five cents each, by addressing the "Commissioner of Patents, Washington, D. C."